United States Patent
Wang et al.

(10) Patent No.: US 9,266,207 B2
(45) Date of Patent: Feb. 23, 2016

(54) OBLIQUE-DRIVEN PLATFORM HAVING THREE COPLANAR DRIVING AXES

(71) Applicant: CHUNG YUAN CHRISTIAN UNIVERSITY, Zhongli, Taoyuan County (TW)

(72) Inventors: Shih-Ming Wang, Taipei (TW); Che-Hsuan Hsu, Taoyuan (TW)

(73) Assignee: CHUNG YUAN CHRISTIAN UNIVERSITY (TW)

( * ) Notice: Subject to any disclaimer, the term of this patent is extended or adjusted under 35 U.S.C. 154(b) by 164 days.

(21) Appl. No.: 14/215,161

(22) Filed: Mar. 17, 2014

(65) Prior Publication Data

US 2015/0183072 A1    Jul. 2, 2015

(30) Foreign Application Priority Data

Dec. 30, 2013   (TW) .............................. 102148986 A

(51) Int. Cl.
| | |
|---|---|
| *B25B 11/00* | (2006.01) |
| *B23Q 3/18* | (2006.01) |
| *B23Q 1/44* | (2006.01) |
| *B23Q 1/60* | (2006.01) |
| *B23Q 1/62* | (2006.01) |

(52) U.S. Cl.
CPC .. *B23Q 3/18* (2013.01); *B23Q 1/44* (2013.01); *B23Q 1/60* (2013.01); *B23Q 1/625* (2013.01)

(58) Field of Classification Search
USPC ...................................................... 261/111
See application file for complete search history.

(56) References Cited

U.S. PATENT DOCUMENTS

| | | | | |
|---|---|---|---|---|
| 5,262,617 | A * | 11/1993 | Higashiguchi ......... | B23Q 1/625 219/221 |
| 5,732,937 | A * | 3/1998 | Morghen ................. | B23Q 3/18 269/100 |
| 5,857,251 | A * | 1/1999 | Schwarzenberger .... | B23Q 3/18 29/33 P |
| 6,328,507 | B1 * | 12/2001 | Shoda ..................... | B23Q 1/032 269/21 |
| 2007/0295138 | A1 * | 12/2007 | Wang ....................... | B23Q 1/58 74/490.07 |
| 2013/0207330 | A1 * | 8/2013 | Wang ....................... | B23Q 5/40 269/56 |

FOREIGN PATENT DOCUMENTS

| | | | | |
|---|---|---|---|---|
| CH | EP 0972608 | A1 * | 1/2000 | ............. B23Q 1/56 |
| DE | 10019669 | A1 * | 10/2001 | ............. B23Q 1/017 |

* cited by examiner

*Primary Examiner* — Lee D Wilson
*Assistant Examiner* — Alvin Grant

(57) ABSTRACT

The present invention relates to an oblique-driven platform having three coplanar driving axes, in which three oblique driving modules are disposed on an identical base, so as to drive a work platform to rotate and carry out 2-dimensional motion by the controlling of the three oblique driving modules. Thus, this design could solve the problems occurring in the conventional stacked machine tools; such as the deformation or the displacement of the sever axis or the rotation axis caused by the upper-layer machine tools. Moreover, by the disposing of the three oblique driving modules, the work platform can be driven to stably rotate and carry out 2-dimensional motion with high precision and high accuracy.

9 Claims, 9 Drawing Sheets

OBLIQUE-DRIVEN PLATFORM HAVING THREE COPLANAR DRIVING AXES

BACKGROUND OF THE INVENTION

1. Field of the Invention

The present invention relates to a high-precision machine tool platform, and more particularly, to an oblique-driven platform having three coplanar driving axes.

2. Description of the Prior Art

With the development of industry and technology, every industrial product now progresses toward micro and concise. Hence, a new developed topic on micro/meso-scale manufacturing technology will be critical to manufacturing technology, wherein the micro/meso-scale drilling technology can be applied to national defense, aerial transportations, electronic devices, optical devices, communication, and bio-medical industry, particularly to high speed communication micro optical devices, micro-actuator and micro-sensor on vehicle and medical tools, micro-nozzle on high temperature jet engine, and micro fuel cell.

Currently, the micro/meso-scale drilling technology is mostly achieved by using multi-axles machine tool. General machine tool and work platform lays a X axis moving device, a Y axis moving device and a rotating axis on one point, so as to make the machine tool and work platform move or rotate. However, the design of laying the X axis moving device, the Y axis moving device and the rotating axis on each other has some flaws, such as sever axis system would consume more energy and easily occur displacement or transformation.

Accordingly, in view of the conventional machine tool and work platform still have shortcomings and drawbacks, the inventor of the present application has made great efforts to make inventive research thereon and eventually provided an oblique-driven platform having three coplanar driving axes.

SUMMARY OF THE INVENTION

The primary objective of the present invention is to provide an oblique-driven platform having three coplanar driving axes, in which three oblique driving modules are disposed on an identical base, so as to drive a work platform to rotate and carry out 2-dimensional motion by the controlling of the three oblique driving modules. Thus, this design could solve the problems occurring in the conventional stacked machine tools; such as the deformation or the displacement of the sever axis or the rotation axis caused by the upper-layer machine tools. Moreover, by the disposing of the three oblique driving modules, the work platform can be driven to stably rotate and carry out 2-dimensional motion with high precision and high accuracy.

Accordingly, to achieve the primary objective of the present invention, the inventor of the present invention provides an oblique-driven platform having three coplanar driving axes, comprising:

a base;

a first oblique driving module, being disposed on the base and distanced from the center of the base with a first distance;

a second oblique driving module, being disposed on the base and distanced from the center of the base with a second distance, wherein the second oblique driving module is opposite to the first oblique driving module on a first planar axis; and a third oblique driving module, being disposed on the base and distanced from the center of the base with a third distance, wherein the third oblique driving module is opposite to the second oblique driving module on a second planar axis, and the third oblique driving module is opposite to the first oblique driving module at a diagonal line between the first planar axis and the second planar axis; moreover, each of the first oblique driving module, the second oblique driving module, and the third oblique driving module comprise: a driving unit; an oblique sliding unit, being disposed on the driving unit and driven by the driving unit to slide back and forth; and a work platform, being disposed on the oblique sliding units of the first oblique driving module, the second oblique driving module, and the third oblique driving module;

wherein the oblique sliding unit of the second oblique driving module would drive the work platform to slide along the first axis when the driving unit of the second oblique driving module is operated singly;

wherein the oblique sliding units of the first oblique driving module and the third oblique driving module would drive the work platform to slide along the second axis when the driving units of the first oblique driving module and the third oblique driving module are operated at the same time;

wherein the oblique sliding units of the first oblique driving module, the second oblique driving module and the third oblique driving module would drive the work platform rotate on a co-plane constructed by the first axis and the second axis when the driving units of the first oblique driving module, the second oblique driving module and the third oblique driving module are operated simultaneously.

BRIEF DESCRIPTION OF THE DRAWINGS

The invention as well as a preferred mode of uses and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe an oblique-driven platform having three coplanar driving axes according to the present invention, embodiments of the present invention will be described in detail with reference to the attached drawings hereinafter.

Figure 1:
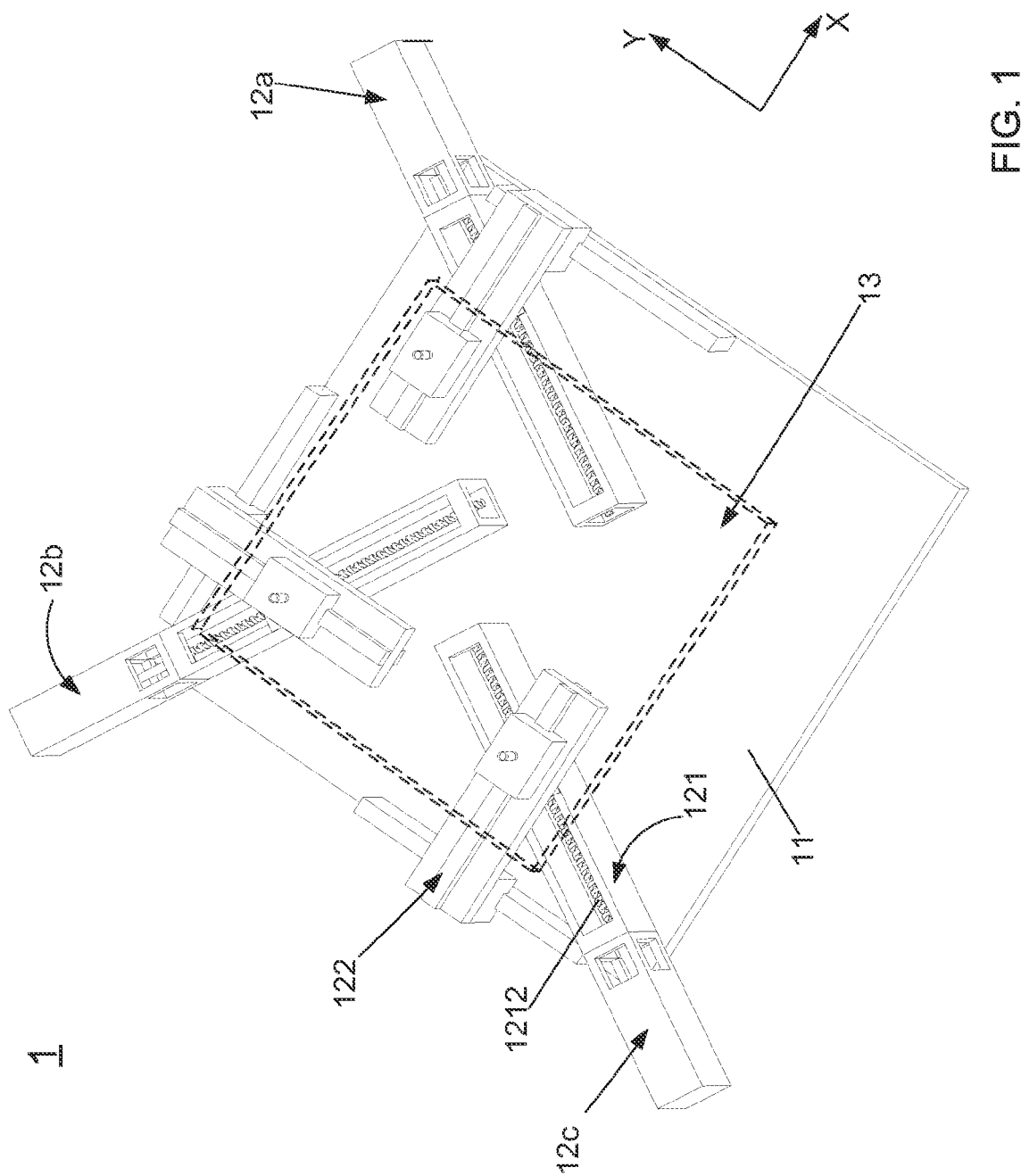
FIG. 1 is a stereo view of an oblique-driven platform having three coplanar driving axes according to the present invention.
Figure 2:
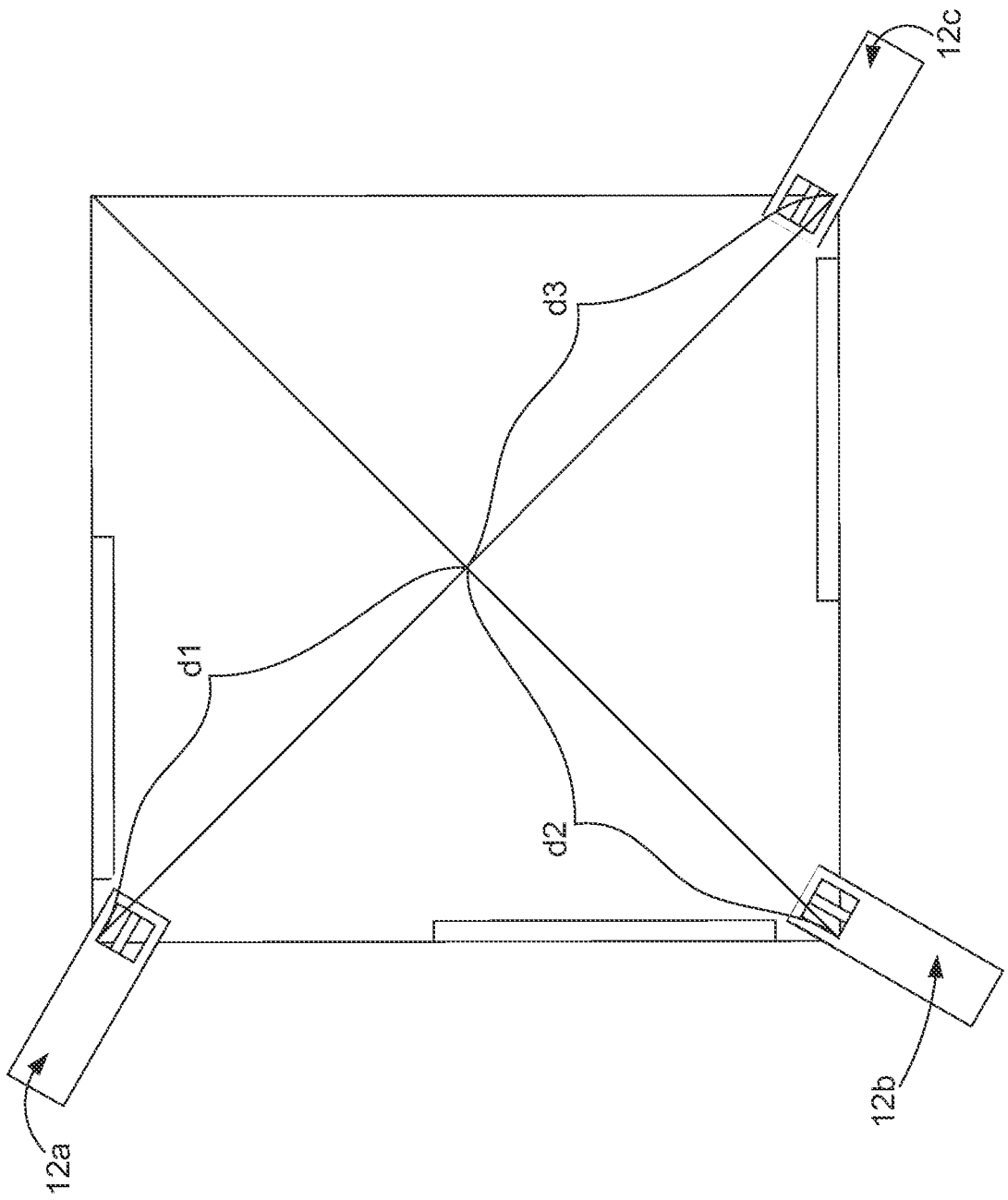
FIG. 2 is a schematic top view of a first oblique driving module, a second oblique driving module and a third oblique driving module on a base.

With reference to FIG. 1, which illustrate a stereo view of an oblique-driven platform having three coplanar driving axes according to the present invention. Moreover, please simultaneously refer to FIG. 2, there is shown a schematic top view of a first oblique driving module, a second oblique driving module and a third oblique driving module on a base. As shown in FIG. 1 and FIG. 2, the oblique-driven platform 1 of the present invention consists of a base 11, a first oblique driving module 12*a*, a second oblique driving module 12*b*, a third oblique driving module 12*c*, and a work platform 13, wherein the first oblique driving module 12*a* is disposed on the base 11 and distanced from the center of the base 11 with a first distance d1. In addition, the second oblique driving module 12*b* is disposed on the base 11 and distanced from the center of the base 11 with a second distance d2, wherein the second oblique driving module 12*b* is opposite to the first oblique driving module 12*a* on a first planar axis X. Moreover, the third oblique driving module 12*c* is disposed on the base 11 and distanced from the center of the base 11 with a third distance d3, wherein the third oblique driving module 12*c* is opposite to the second oblique driving module 12*b* on a second planar axis Y. Particularly, in the oblique-driven platform 1 having three coplanar driving of the present invention, the first distance d1 is equal to the second distance d2 and the third distance d3.

Figure 3:
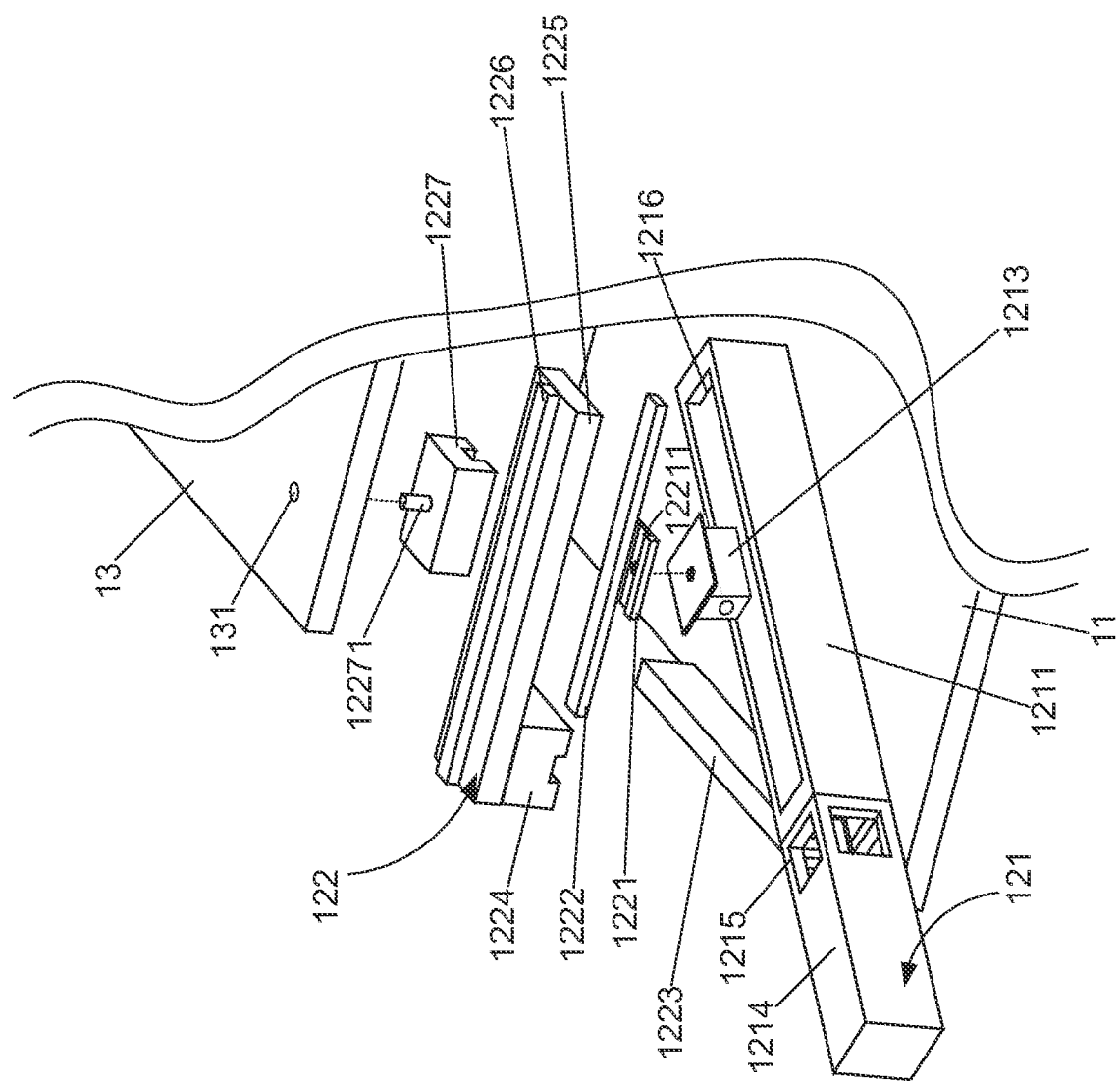
FIG. 3 is an exploded view of a driving unit and an oblique sliding unit.

Continuously referring to FIG. 1 and FIG. 2, and please simultaneously refer to FIG. 3, which illustrate an exploded view of view of a driving unit and an oblique sliding unit. As FIG. 3 shows, each of the first oblique driving module 12*a*, the second oblique driving module 12*b*, and the third oblique driving module 12*c* are consisted of a driving unit 121 and an oblique sliding unit 122, wherein the oblique sliding unit 122 is disposed on the driving unit 121 and capable of being driven by the driving unit 121 to slide back and forth. Besides, the work platform 13 is disposed on the oblique sliding units of the first oblique driving module 12*a*, the second oblique driving module 12*b*, and the third oblique driving module 12*c*.

Inheriting to above descriptions, the driving unit 121 comprises a first rail 1211 disposed on the base 11, a screw 1212 disposed on the first rail 1211, a first sliding block 1213 disposed on the screw 1212 and a servo motor 1214 coupled to the screw 1212, wherein the servo motor 1214 is used for driving the screw 1212 to rotate, so as to make the first sliding block 1213 slide back and forth along the first rail 1211. Moreover, the driving unit 121 further comprises a motor base 1215 and a fixing block 1216, wherein the motor base 1215 is disposed between the servo motor 1214 and the screw 1212 for fixing the servo motor 1214 and stabilizing the screw 1212.

Furthermore, the oblique sliding unit 122 comprises a second sliding block 1221, an oblique slide rod 1222, a second rail 1223, a third sliding block 1224, a connecting member 1225, a third rail 1226, and a forth sliding block 1227, wherein the second sliding block 1221 is disposed on the first sliding block and having an accommodating groove 12211. In addition, the oblique slide rod 1222 is disposed on the second sliding block 1221 and partially accommodated in the accommodating groove 12211. Besides, the third sliding block 1224 is disposed on the second rail 1223 disposed on the base 11 and capable of sliding on the second rail 1223 back and forth. The third rail 1226 is disposed on the connecting member 1225 disposed on the oblique slide rod 1222 and the third sliding block 1224 and perpendicular to the second rail 1223. Moreover, the forth sliding block 1227 is disposed on the third rail 1226 and capable of sliding on the third rail 1226 back and forth, wherein a pivotal axis 12271 is formed on the forth sliding block 1227.

Figure 4:
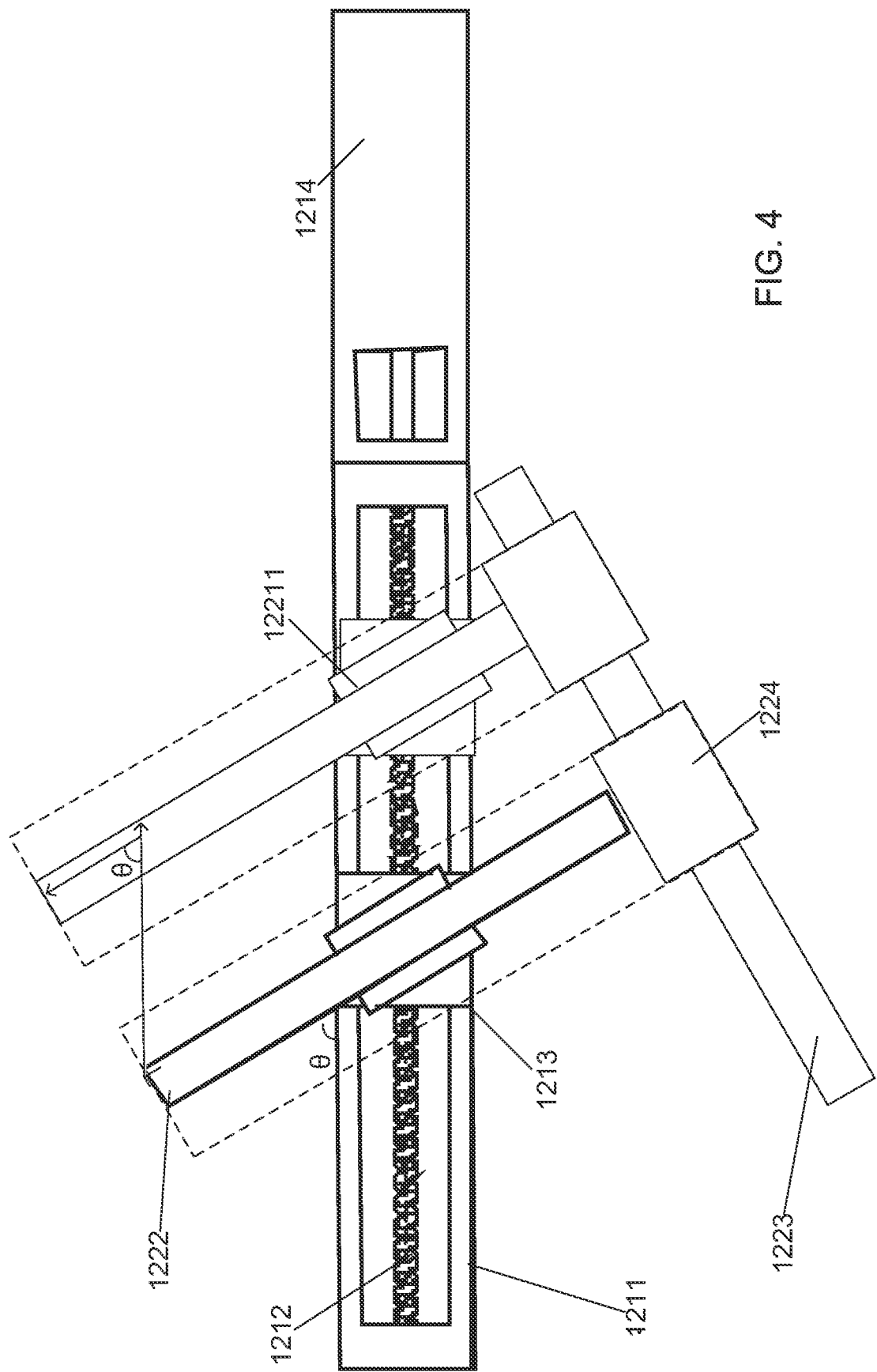
FIG. 4 is a top view of the driving unit and the oblique sliding unit.

Referring to FIG. 1, FIG. 2 and FIG. 3 again, and please simultaneously refer to FIG. 4, which illustrate a top view of the driving unit and the oblique sliding unit. As FIG. 4 shows, the second rail 1223 is perpendicular to the oblique slide rod 1222 and the third rail 1226 oppositely, and an oblique drive angle θ is especially formed between the oblique slide rod 1222 and the screw 1212. Thus, by modulating the trigonometric relationships between the oblique slide rod 1222 and the screw 1212, engineers could find and design an optimum platform displacement according to the used screws 1212 having different thread pitch precision. Moreover, as shown in FIGS., there has a first pivotal hole 131*a*, a second pivotal hole 131*b*, and a third pivotal hole 131*c* being disposed on the work platform 13 and connected to the pivotal axes 12271 of the first oblique driving module 12*a*, the second oblique driving module 12*b* and the third oblique driving module 12*c*, respectively. Particularly, in the oblique-driven platform 1 having three coplanar driving of the present invention, the first pivotal hole 131*a*, the second pivotal hole 131*b*, and the third pivotal hole 131*c* are distanced from the center point of the work platform 13 with a first spacing distance, a second spacing distance and a third spacing distance, respectively; moreover, the first spacing distance is equal to the second spacing distance, and the first spacing distance is equal to the third spacing distance.

Thus, through above descriptions, the constituting elements of the oblique-driven platform 1 having three coplanar driving axes of the present invention have been introduced completely and clearly; next, the operation theorem and motion ways of the oblique-driven platform 1 having three coplanar driving axes would be further introduced and explained in following descriptions.

As shown in FIG. 4, when the servo motor 1214 operates to drive the screw 1212, the first sliding block 1213 would slide forward (or backward) along the first rail 1211 with a displacement along the first rail 1211, meanwhile the oblique slide rod 1222 would simultaneously slide in the accommodating groove 12211. Moreover, when the oblique slide rod 1222 slides in the accommodating groove 12211, the oblique slide rod 1222 would drive the third sliding block 1224 slide along the second rail 1223 backward (or forward) in order to maintain the oblique drive angle θ with the sane value.

Figure 5A:
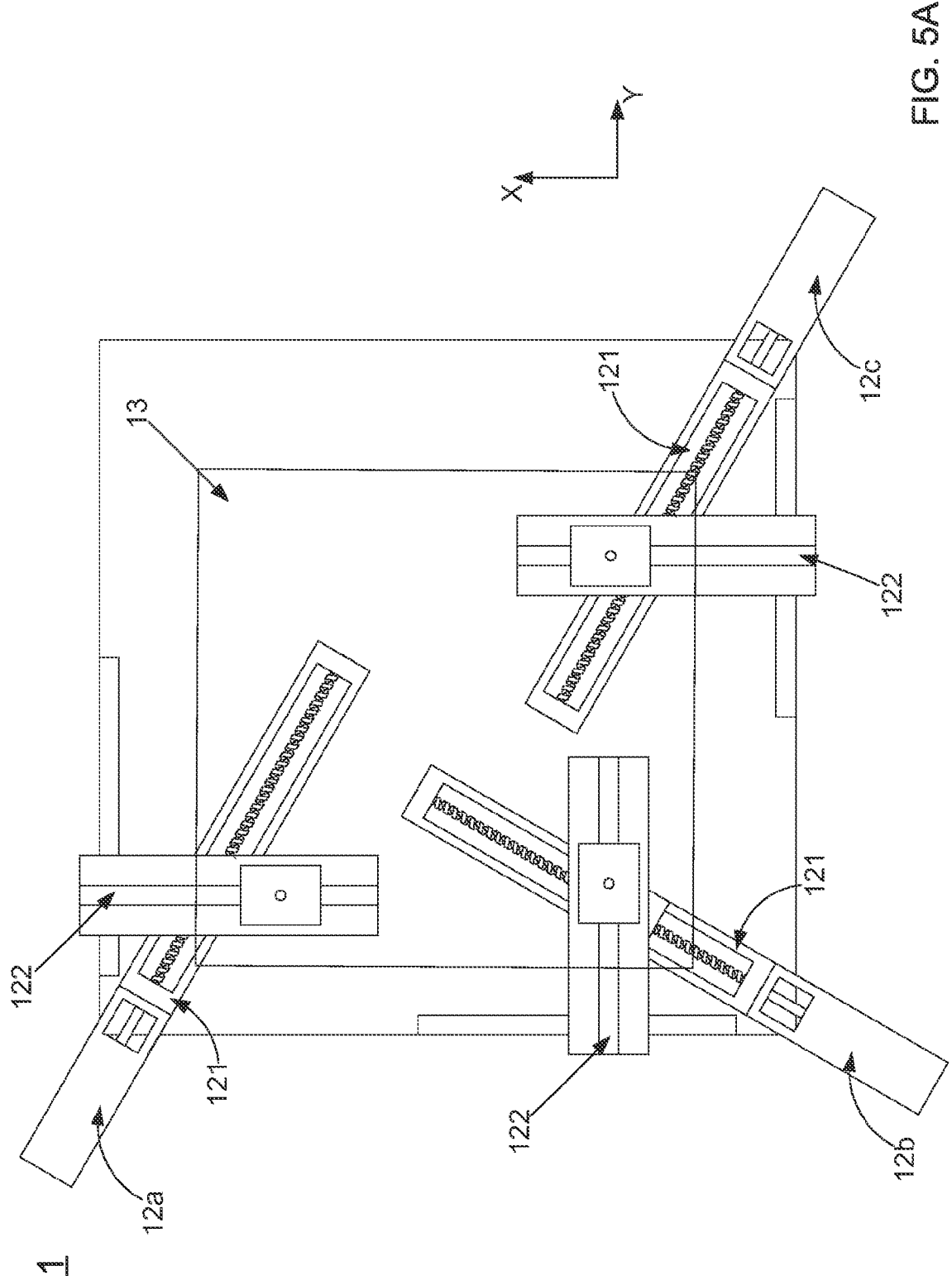
FIGS. 5A-5E are schematic operation diagrams of the oblique-driven platform having three coplanar driving axes according to the present invention.
Figure 5B:
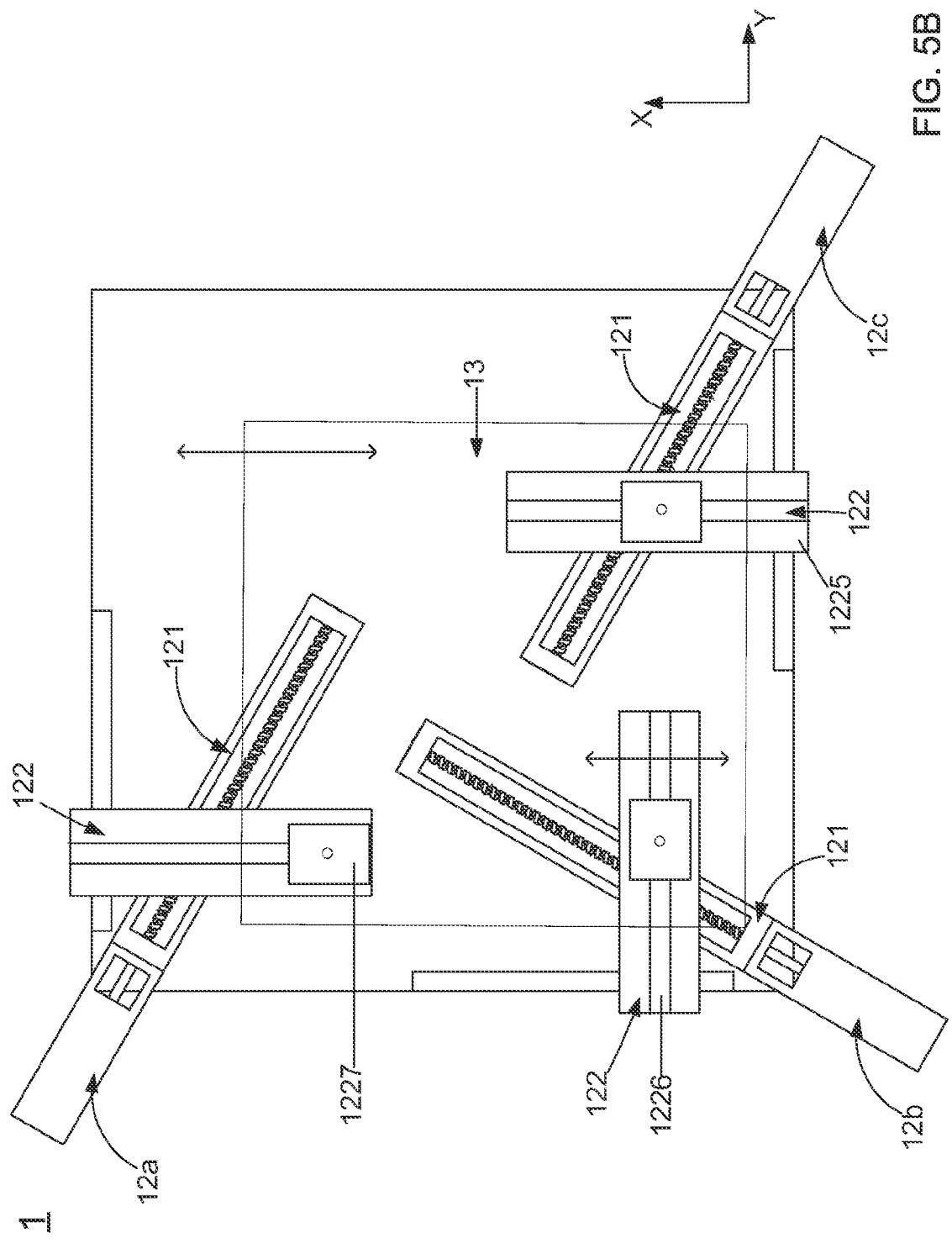

Please continuously refer to FIGS. 5A-5E, which illustrate schematic operation diagrams of the oblique-driven platform having three coplanar driving axes according to the present invention. As FIG. 5A shows, the work platform 13 is at an initial position thereof when the first oblique driving module 12*a*, the second oblique driving module 12*b*, and the third oblique driving module 12*c* does not be operated. As FIG. 5B shows, the connecting member 1225 disposed on the oblique slide rod 1222 of the second oblique driving module 12*b* would slide along the first planar axis X when the driving unit 121 of the second oblique driving module 12*b* is operated singly; meanwhile, the oblique sliding unit 122 of the first oblique driving module 12*a* and the forth sliding block 1227 of the oblique sliding unit 122 of the third oblique driving module 12*c* slides along the first planar axis X on the related third rail 1226 thereof, respectively. At the same time, the forth sliding block 1227 of the oblique sliding unit 122 of the second oblique driving module 12*b* slides on the related third rail 1226 thereof, so as to drive the work platform 13 to slide along the first planar axis X on the driving unit 121.

Figure 5C:
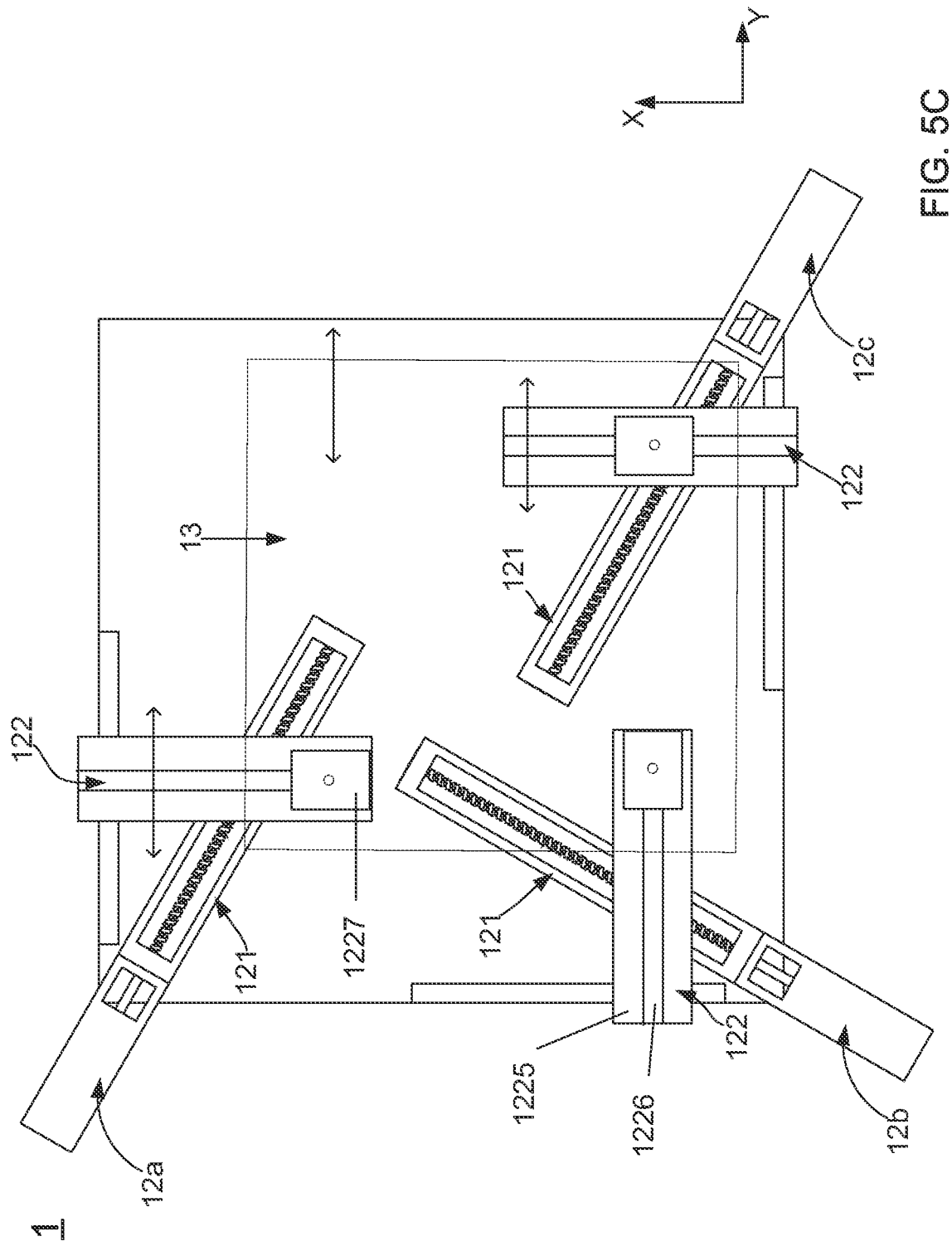

Also, as FIG. 5C shows, the oblique sliding unit 122 of the first oblique driving module 12*a* and the connecting member 1225 disposed on the oblique slide rod 1222 of the third oblique driving module 12*c* would slide along the second axis Y when the driving units 121 of the first oblique driving module 12*a* and the third oblique driving module 12*c* are operated at the same time; meanwhile, the forth sliding block 1227 of the oblique sliding unit 122 of the second oblique driving module 12*b* slides along the second planar axis Y on the third rail 1226. Moreover, the oblique sliding unit 122 of the first oblique driving module 12*a* and the forth sliding block 1227 of the oblique sliding unit 122 of the third oblique driving module 12*c* respectively slide along the first planar axis X on the related third rail 1226 thereof, so as to drive the work platform 13 slide along the second planar axis Y on the driving unit 121.

Figure 5D:
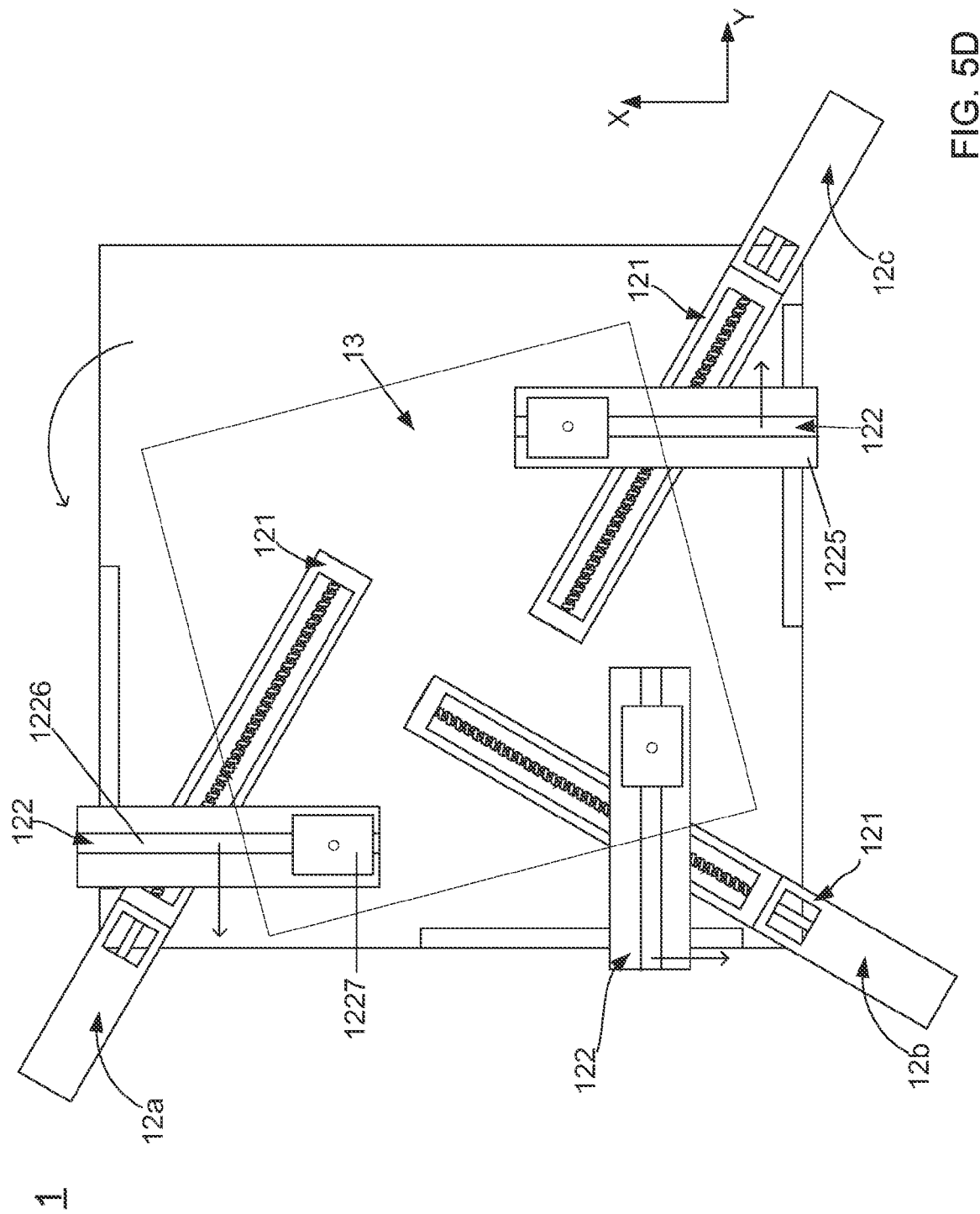

Furthermore, as FIG. 5D shows, the driving units 122 of the first oblique driving module 12a, the second oblique driving module 12b and the third oblique driving module 12c can be operated simultaneously, such that the connecting members 1225 of the first oblique driving module 12a and the third oblique driving module 12c slide along the second axis Y opposite to each other, and the connecting member 1225 of the second oblique driving module 12b slide along the first axis X oppositely. Meanwhile, the forth sliding block 1227 of the oblique sliding unit 122 of the first oblique driving module 12a slides oppositely along the first planar axis X on its third rail 1226, the forth sliding block 1227 of the oblique sliding unit 122 of the second oblique driving module 12b slides positively along the second planar axis Y on its third rail 1226, and the forth sliding block 1227 of the oblique sliding unit 122 of the third oblique driving module 12c slides positively along the first planar axis X on its third rail 1226. Thus, the oblique sliding units 122 of the first oblique driving module 12a, the second oblique driving module 12b and the third oblique driving module 12c drive the work platform 13 to rotate counterclockwise on a co-plane constructed by the first axis X and the second axis Y.

Figure 5E:
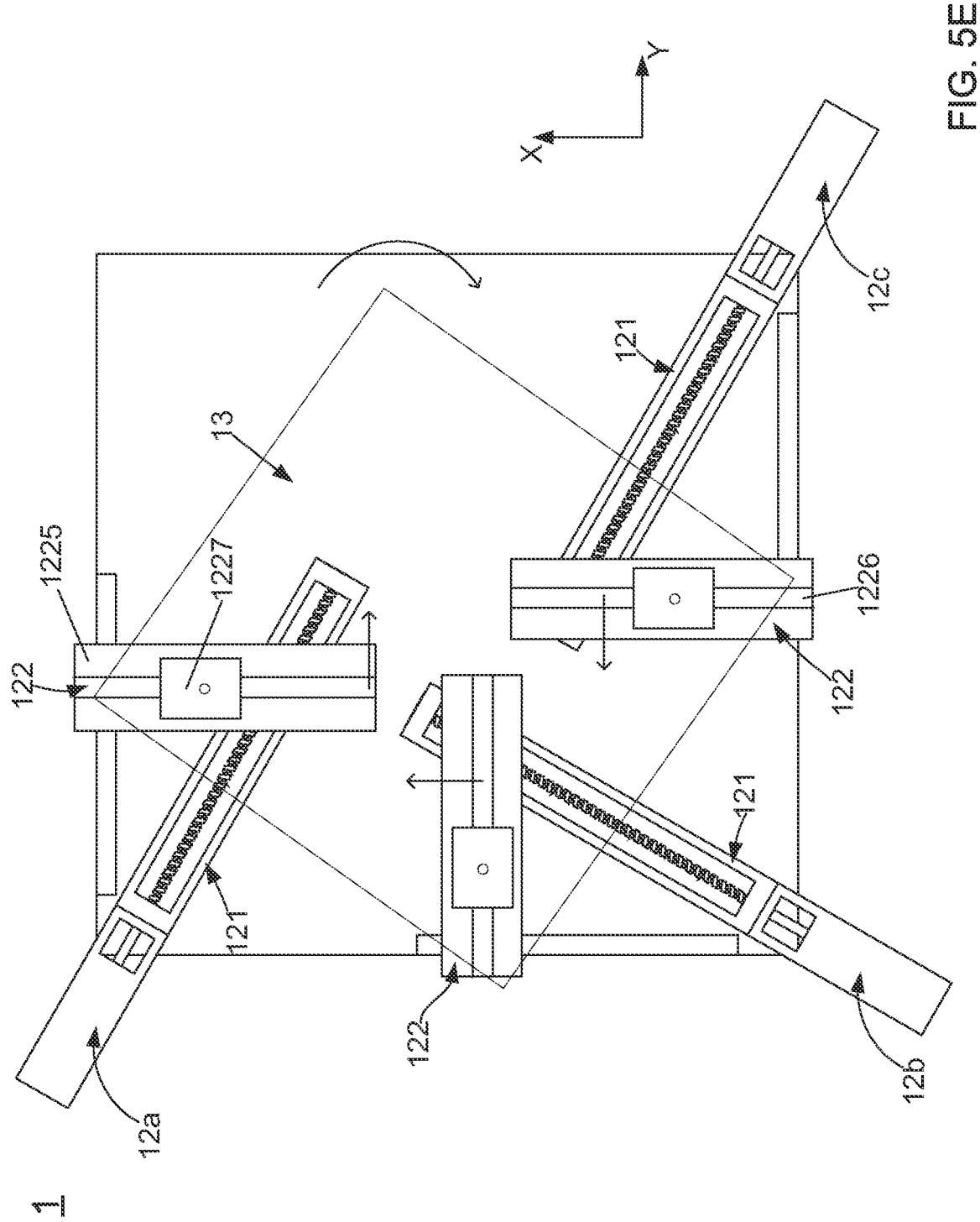

Furthermore, as FIG. 5E shows, the driving unit 122 of the first oblique driving module 12a, the second oblique driving module 12b and the third oblique driving module 12c can also be operated simultaneously for making the connecting member 1225 of first oblique driving module 12a slide along the second axis Y, the connecting member 1225 of the second oblique driving module 12b slide along the first axis X, and the connecting member 1225 of the third oblique driving module 12c slide along the second axis Y opposite to the first oblique driving module 12a. Meanwhile, the forth sliding block 1227 of the oblique sliding unit 122 of the first oblique driving module 12a slides along the first planar axis X on its third rail 1226, the forth sliding block 1227 of the oblique sliding unit 122 of the second oblique driving module 12b slides oppositely along the second planar axis Y on its third rail 1226, and the forth sliding block 1227 of the oblique sliding unit 122 of the third oblique driving module 12c slides oppositely along the first planar axis X on its third rail 1226. Therefore, the oblique sliding unit 122 of the first oblique driving module 12a, the second oblique driving module 12b and the third oblique driving module 12c drive the work platform 13 to rotate clockwise on the co-plane constructed by the first axis X and the second axis Y.

Thus, through the foregoing descriptions, the oblique-driven platform having three coplanar driving axes has been completely introduced and disclosed; in summary, the present invention has the following advantages:

1. In the present invention, the proposed oblique-driven platform 1 having three coplanar driving axes includes three oblique driving modules (12a, 12b, 12c) disposed on an identical base for driving a work platform 13 to rotate and carry out 2-dimensional motion by the controlling of the three oblique driving modules (12a, 12b, 12c). Thus, this design could solve the problems occurring in the conventional stacked machine tools; such as the deformation or the displacement of the sever axis or the rotation axis caused by the upper-layer machine tools.

2. Inheriting to above point 1, moreover, by the disposing of the three oblique driving modules (12a, 12b, 12c), the work platform 13 can be driven to stably rotate and carry out 2-dimensional motion with high precision and high accuracy.

The above description is made on embodiments of the present invention. However, the embodiments are not intended to limit scope of the present invention, and all equivalent implementations or alterations within the spirit of the present invention still fall within the scope of the present invention.

What is claimed is:

1. An oblique-driven platform having three coplanar driving axes, comprising:
    a base;
    a first oblique driving module, being disposed on the base and distanced from the center of the base with a first distance;
    a second oblique driving module, being disposed on the base and distanced from the center of the base with a second distance, wherein the second oblique driving module is opposite to the first oblique driving module on a first planar axis; and
    a third oblique driving module, being disposed on the base and distanced from the center of the base with a third distance, wherein the third oblique driving module is opposite to the second oblique driving module on a second planar axis, and the third oblique driving module is opposite to the first oblique driving module at a diagonal line between the first planar axis and the second planar axis; moreover, each of the first oblique driving module, the second oblique driving module, and the third oblique driving module comprise:
        a driving unit;
        an oblique sliding unit, being disposed on the driving unit and driven by the driving unit to slide back and forth; and
        a work platform, being disposed on the oblique sliding units of the first oblique driving module, the second oblique driving module, and the third oblique driving module;
    wherein the oblique sliding unit of the second oblique driving module would drive the work platform to slide along the first axis when the driving unit of the second oblique driving module is operated singly;
    wherein the oblique sliding units of the first oblique driving module and the third oblique driving module would drive the work platform to slide along the second axis when the driving units of the first oblique driving module and the third oblique driving module are operated at the same time;
    wherein the oblique sliding units of the first oblique driving module, the second oblique driving module and the third oblique driving module would drive the work platform to rotate on a co-plane constructed by the first axis and the second axis when the driving units of the first oblique driving module, the second oblique driving module and the third oblique driving module are operated simultaneously.

2. The oblique-driven platform having three coplanar driving axes of claim 1, wherein the driving unit comprises:
    a first rail, being disposed on the base;
    a screw, being disposed on the first rail;
    a first sliding block, being disposed on the screw and able to slide along the first rail by way of the rotation of the screw; and
    a servo motor, being coupled to the screw for driving the screw to rotate, so as to make the first sliding block slide back and forth along the first rail.

3. The oblique-driven platform having three coplanar driving axes of claim 1, wherein the first distance is equal to second distance, and the first distance is equal to the third distance.

4. The oblique-driven platform having three coplanar driving axes of claim 2, wherein the oblique sliding unit comprises:
- a second sliding block, being disposed on the first sliding block and having an accommodating groove;
- an oblique slide rod, being disposed on the second sliding block and partially accommodated in the accommodating groove, wherein an oblique drive angle is formed between the oblique slide rod and the screw.

5. The oblique-driven platform having three coplanar driving axes of claim 2, wherein the driving unit further comprises:
- a motor base, being disposed between the servo motor and the screw for fixing the servo motor and stabilizing the screw; and
- a fixing block, being disposed on the base and opposite to the servo motor, and being used for connecting the first rail and the screw and fixing the first rail and the screw on the base.

6. The oblique-driven platform having three coplanar driving axes of claim 4, wherein the oblique sliding unit further comprises:
- a second rail, being disposed on the base and perpendicular to the oblique slide rod oppositely;
- a third sliding block, being disposed on the second rail and capable of sliding on the second rail back and forth;
- a connecting member, being disposed on the oblique slide rod and the third sliding block;
- a third rail, being disposed on the connecting member and perpendicular to the second rail oppositely; and
- a forth sliding block, being disposed on the third rail and capable of sliding on the third rail back and forth, wherein a pivotal axis is formed on the forth sliding block.

7. The oblique-driven platform having three coplanar driving axes of claim 6, wherein a first pivotal hole, a second pivotal hole and a third pivotal hole are disposed on the work platform, and the pivotal axes of the first oblique driving module, the second oblique driving module and the third oblique driving module being connected to the first pivotal hole, the second pivotal hole and the third pivotal hole, respectively.

8. The oblique-driven platform having three coplanar driving axes of claim 7, wherein the first pivotal hole, the second pivotal hole, and the third pivotal hole are distanced from the center point of the work platform with a first spacing distance, a second spacing distance and a third spacing distance, respectively.

9. The oblique-driven platform having three coplanar driving axes of claim 8, wherein the first spacing distance is equal to the second spacing distance, and the first spacing distance is equal to the third spacing distance.

* * * * *